United States Patent
Nakakuki

(10) Patent No.: US 7,940,314 B2
(45) Date of Patent: May 10, 2011

(54) IMAGE-SIGNAL PROCESSING DEVICE

(75) Inventor: Toshio Nakakuki, Mizuho (JP)

(73) Assignees: Sanyo Electric Co., Ltd., Moriguchi (JP); Sanyo Semiconductor Co., Ltd., Ora-Gun (JP)

( * ) Notice: Subject to any disclaimer, the term of this patent is extended or adjusted under 35 U.S.C. 154(b) by 765 days.

(21) Appl. No.: 11/882,836

(22) Filed: Aug. 6, 2007

(65) Prior Publication Data

US 2008/0036885 A1 Feb. 14, 2008

(30) Foreign Application Priority Data

Aug. 9, 2006 (JP) .................................. 2006-216586

(51) Int. Cl.
*H04N 5/217* (2011.01)
*H04N 9/64* (2006.01)

(52) U.S. Cl. ........ 348/241; 348/243; 348/244; 348/245; 348/246; 348/251

(58) Field of Classification Search .......... 348/241–251, 348/234–238, 370; 382/260–266, 274, 275; 358/3.26, 3.27, 463
See application file for complete search history.

(56) References Cited

U.S. PATENT DOCUMENTS

| | | | |
|---|---|---|---|
| 7,508,421 B2 * | 3/2009 | Tamaru et al. ............. | 348/229.1 |
| 2004/0145664 A1 * | 7/2004 | Kobayashi et al. ........... | 348/246 |
| 2004/0252208 A1 * | 12/2004 | Lee ................................ | 348/241 |
| 2005/0073592 A1 * | 4/2005 | Aotsuka ....................... | 348/224.1 |
| 2006/0029287 A1 * | 2/2006 | Hayashi et al. ............... | 382/261 |
| 2006/0038899 A1 * | 2/2006 | Tamaru et al. ................. | 348/241 |

FOREIGN PATENT DOCUMENTS

JP A 2006-013948 1/2006

* cited by examiner

*Primary Examiner* — Sinh Tran
*Assistant Examiner* — Selam Gebriel
(74) *Attorney, Agent, or Firm* — Oliff & Berridge, PLC

(57) ABSTRACT

Defect correction and other de-noising as well as resolution maintenance and contour correction can all be appropriately performed in an image-signal processing device for processing an image signal from an image sensor. First through third de-noising parts 30a through 30c are provided separately to correspond to a brightness-processing part 36, a color-processing part 40, and a contour-processing part 38, respectively. Among defect-correcting parts 42a through 42c provided to the de-noising parts 30a through 30c, respectively, the defect-correcting part 42c provided to correspond to the contour-processing part 38 is set to a low defect-correction level and maintains contour information. The defect-correcting part 42a provided to correspond to the brightness-processing part 36 is set to an intermediate correction level and corrects pixel defects while maintaining resolution. The defect-correcting part 42b provided to correspond to the color-processing part 40 is set to a high correction level and appropriately removes pixel defects.

11 Claims, 3 Drawing Sheets

IMAGE-SIGNAL PROCESSING DEVICE

CROSS-REFERENCE TO RELATED APPLICATIONS

The priority application number JP2006-216586 upon which this patent application is based is hereby incorporated by the reference.

BACKGROUND OF THE INVENTION

1. Field of the Invention

The present invention relates to an image-signal processing device for performing processing in which image signal noise generated by pixel defects and the like in an image sensor is reduced.

2. Description of the Prior Art

Digital cameras and other imaging apparatuses generate image signals using CCD (charge coupled device) image sensors or other solid-state image sensors. Pixel size has been reduced due to the increasingly higher pixel counts of solid-state image sensors, and difficult manufacturing processes are necessary. Due to these circumstances, pixel defects are not uncommon in the solid-state image sensors used in imaging apparatuses. Pixel defects include black-spot pixels that produce signal charges at a low rate relative to the incident light, and white-spot pixels that produce excessive signal charges due to dark current and the like. Screen noise is generated from the appearance of these black and white spots on the screen. This pixel-defect noise can be rendered unnoticeable by performing correction using image signal processing, and image quality can thereby be ensured.

The dark current noise that is generated by lattice defects and the like in the semiconductor substrate that forms the solid-state image sensor is also significant source of screen noise. Randomly produced dark-current shot noise causes roughness in the image quality. This dark current noise can also be removed by image-signal processing devices, and a variety of processing methods have been proposed for appropriately removing this noise.

FIG. 1 is a block diagram that shows the configuration of a conventional image-signal processing device, wherein image data is generated from performing pixel-defect corrections, noise suppression, and contour correction on the basis of an image signal output from an image sensor 2. The image sensor 2 is, e.g., a CCD image sensor, and the image signal output from the image sensor 2 is converted into digital image data by an A/D converting circuit 6 after being subjected to sample-and-hold and other processes in an analog-signal processing circuit 4. A digital-signal processing circuit 8 retrieves the image data from the A/D converting circuit 6 and performs various processes.

The digital-signal processing circuit 8 comprises a defect-correcting part 10, a noise-suppressing part 12, and a YC separation part 14. The defect-correcting part 10 performs processes for correcting the aforedescribed pixel defects. For example, the defect-correcting part 10 designates pixels having extremely low pixel values relative to surrounding pixels as black spots; designates pixels having extremely large pixel values relative to surrounding pixels as white spots; and substitutes corrected values for the pixel values of the black-spot and white-spot pixels. The corrected values are determined on the basis of the pixels values of the pixels surrounding the respective black-spot and white-spot pixels.

The noise-suppressing part 12 performs processes for suppressing roughness on the screen due to the aforedescribed dark current noise and the like. The noise-suppressing part 12 constitutes, e.g., a median filter, a mean filter, or another type of two-dimensional filter and reduces or removes noise components that differ with each pixel. The pixel range that is prone to the effects of dark current has the property of expanding according to increases in exposure time and temperature. The image-signal processing device proposed in Japanese Laid-open Patent Application No. 2006-13948 is an example of a noise-suppressing circuit for handling the possibility of expansions of the regions that produce such noise.

The YC separation part 14 receives the input of image data that has been subjected to de-noising processes in the defect-correcting part 10 and the noise-suppressing part 12; performs gamma correction and contour correction on the basis of this image data; and generates a brightness signal Y. The YC separation part 14 also performs chroma processing on the basis of the image data input after de-noising and generates color-difference signals U, V.

The contour correction, the generation of the brightness signal Y, and the color-signal generation of the color-difference signals U, V performed in the conventional YC separation part 14 are carried out using image data that has been subjected to de-noising processes in the defect-correcting part 10 and the noise-suppressing part 12. In other words, in conventional configurations, all of the aforementioned processes of the YC separation part 14 are performed on the basis of image signals (image data) of the same de-noising level. The de-noising effect increases if the de-noising level is set high, but on the other hand, spatial changes in the pixel values other than noise are also more likely to be smoothed out and compromised. Problems have therefore arisen in that, conventionally, when the de-noising level is raised, the resolution of the image deteriorates, contour correction is not appropriately performed, and the edges are disturbed.

SUMMARY OF THE INVENTION

The present invention was devised in order to solve the aforementioned problems and provides an image-signal processing device that can maintain appropriate resolution and perform contour correction while performing appropriate de-noising.

An image-signal processing device according to the present invention comprises a de-noising part for performing a de-noising process on a source image signal generated by an image sensor and for generating de-noised image signals of a plurality of types having mutually different de-noising levels and including at least a first de-noised image signal and a second de-noised image signal; a brightness processing part for generating a brightness signal according to the brightness of an image on the basis of the first de-noised image signal; and a color-processing part for generating a color signal according to the color of the image on the basis of the second de-noised image signal, which has a higher de-noising level than that of the first de-noised image signal.

DESCRIPTION OF THE PREFERRED EMBODIMENTS

Embodiments of the present invention will be described below on the basis of the drawings.

Figure 1:
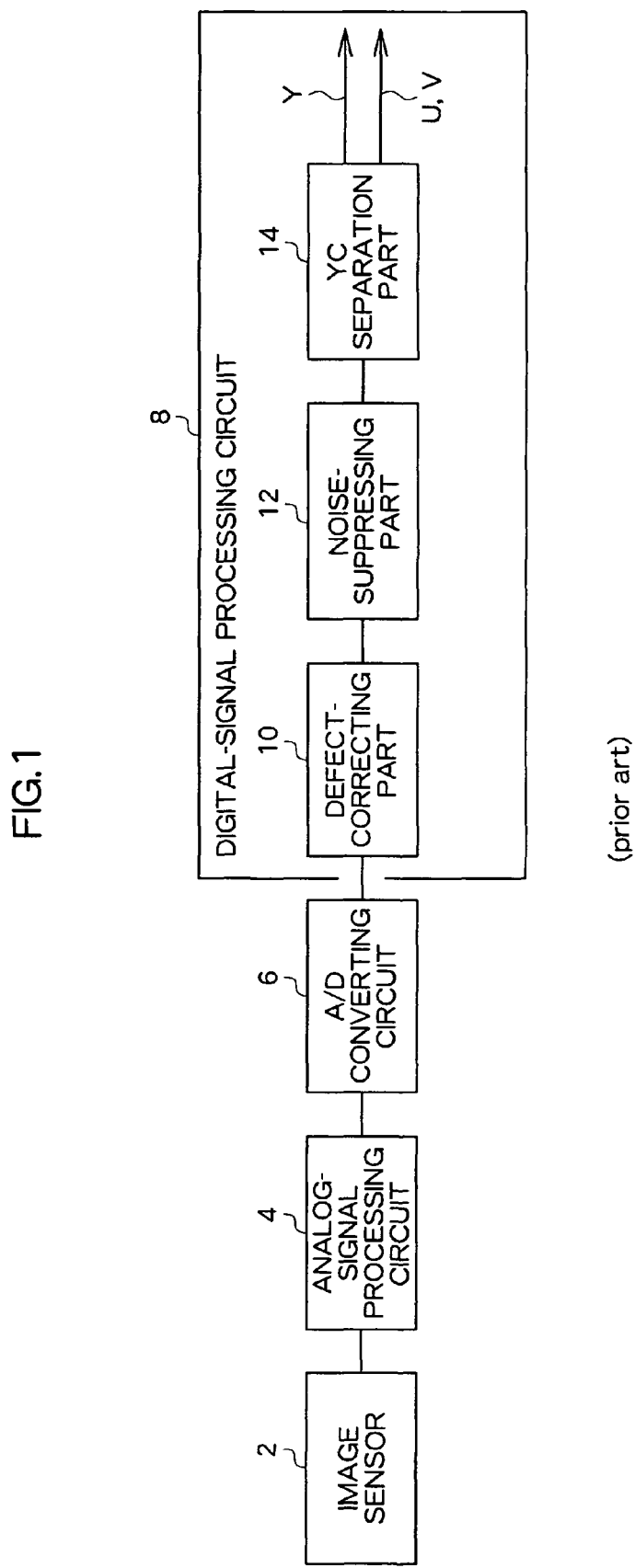
FIG. 1 is a block diagram that shows the configuration of a conventional image-signal processing device.
Figure 2:
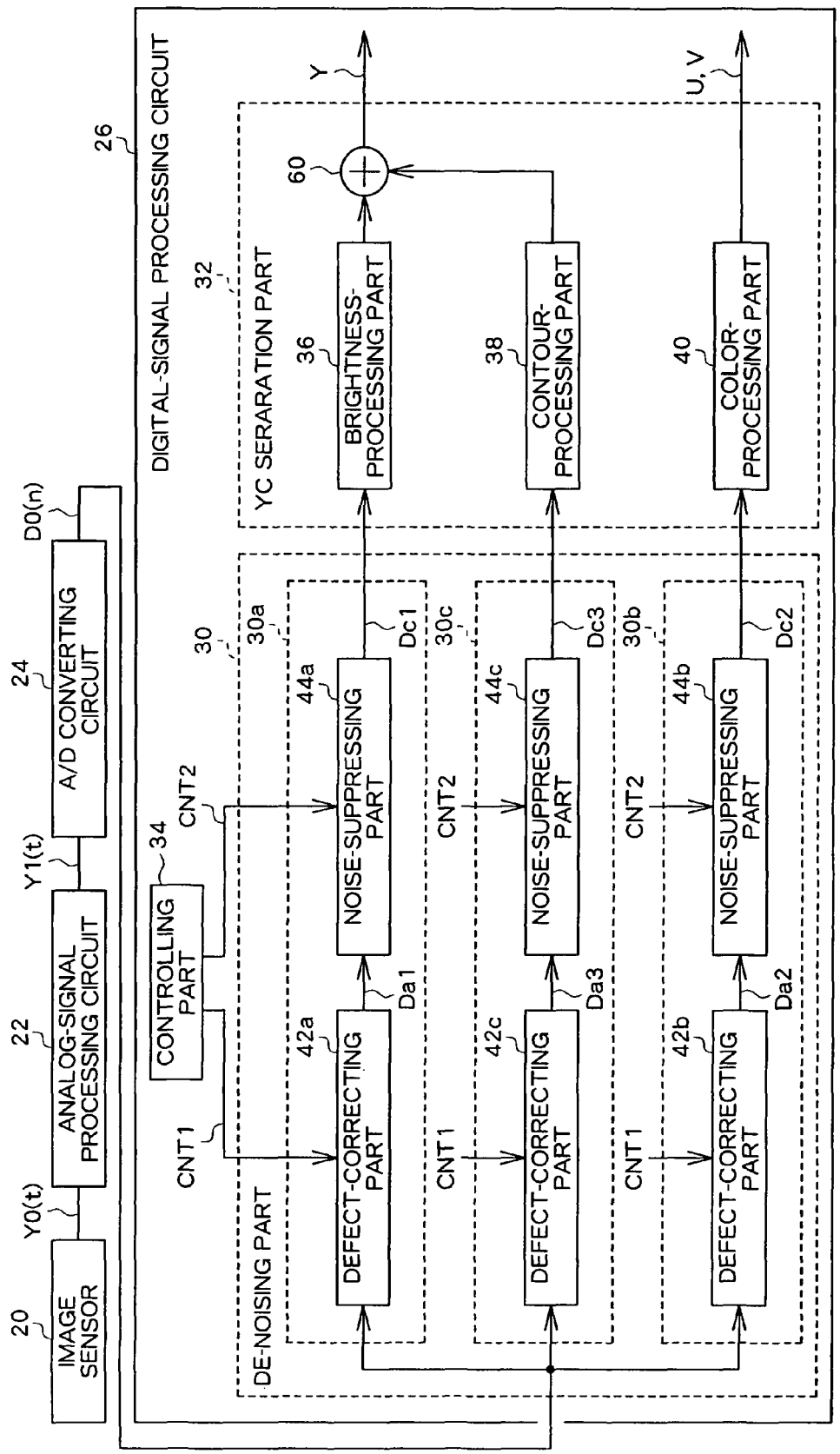
FIG. 2 is a schematic block diagram that shows the configuration of an image-signal processing device that is an embodiment of the present invention.

FIG. 2 is a schematic block diagram that shows the configuration of an image-signal processing device that is an embodiment of the present invention. The image-signal processing device generates image data that has been subjected to pixel-defect correction, noise-suppression, and contour correction on the basis of an image signal output from an image sensor 20. The image sensor 20 in this case is a CCD image sensor. An image signal Y0(t) output from the image sensor 20 is input to an analog-signal processing circuit 22. The analog-signal processing circuit 22 performs sample-and-hold, auto gain control (AGC), and other processes on the image signal Y0(t) and generates an image signal Y1(t) according to a predetermined format. An A/D converting circuit 24 converts the image signal Y1(t) output from the analog-signal processing circuit 22 into digital data and outputs image data D0(n). A digital-signal processing circuit 26 retrieves the image data D0(n) from the A/D converting circuit 24 and performs various processes.

The digital-signal processing circuit 26 comprises a de-noising part 30, a YC separation part 32, and a controlling part 34. The YC separation part 32 comprises a brightness-processing part 36, a contour-processing part 38, and a color-processing part 40. The de-noising part 30 comprises first through third de-noising parts 30a through 30c provided to correspond to the brightness-processing part 36, the color-processing part 40, and the contour-processing part 38, respectively.

The first de-noising part 30a comprises a defect-correcting part 42a and a noise-suppressing part 44a. In the same manner, the second de-noising part 30b comprises a defect-correcting part 42b and a noise-suppressing part 44b, and the third de-noising part 30c comprises a defect-correcting part 42c and a noise-suppressing part 44c. The image data D0(n) is input to, e.g., all of the first through third de-noising parts 30a through 30c. In the respective first through third de-noising parts 30a through 30c, the image data D0(n) is, e.g., corrected for defects by the defect-correcting parts 42a through 42c, then subjected to noise suppression by the noise-suppressing parts 44a through 44c, and output from the respective first through third de-noising parts 30a through 30c.

The first through third de-noising parts 30a through 30c are displayed together in a block configuration in FIG. 2, but differences are provided in the contents of the specific processes performed by the defect-correcting parts or the specific processes performed by the noise-suppressing parts, whereby the respective de-noising levels are mutually different. Specifically, the second de-noising part 30b is set to a higher de-noising level than the first de-noising part 30a, while the third de-noising part 30c is set to a lower de-noising level than the first de-noising part 30a.

Figures 3, 4, 5:
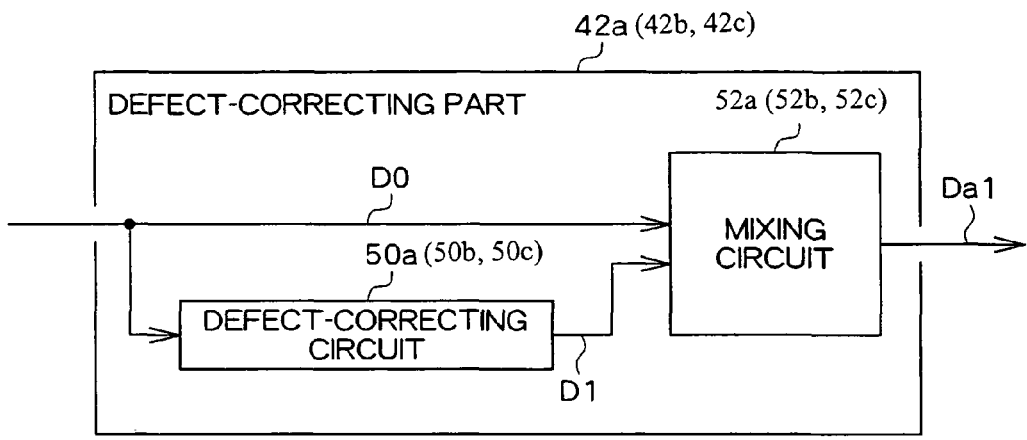
FIG. 3 is a block diagram for describing the schematic configuration of a defect-correcting part.
FIG. 4 is a schematic diagram that shows an example of an arrangement of image data and the positions of reference pixels in an image region used in the defect-correcting process.
FIG. 5 is a schematic diagram that shows an example of an arrangement of image data and the positions of a target pixel and reference pixels in an image region used in two-dimensional filter processing for suppressing noise.

FIG. 3 is a block diagram for describing the schematic configuration of the defect-correcting part 42a. The defect-correcting parts 42b, 42c also have block configurations that are basically identical to the defect-correcting part 42a. The defect-correcting parts 42a through 42c comprise defect-correcting circuits 50a through 50c and mixing circuits 52a through 52c. The image data D0(n) is input to the defect-correcting circuits 50a through 50c and the mixing circuits 52a through 52c.

The defect-correcting circuits 50a through 50c perform processes for correcting the pixel defects of black and white spots. The defect-correcting circuits 50a through 50c, e.g., designate pixels having extremely low values relative to nearby pixels as black spots while designating pixels having extremely large values as white spots, as described above. When the defect-correcting circuits 50a through 50c judge that a target pixel is a defective pixel, a value defined in reference to the pixels surrounding the target pixel is substituted for the pixel value of the target pixel.

FIG. 4 is a schematic diagram that shows an example of an arrangement of image data and the positions of reference pixels in an image region (referred to as a "window" below) used in the defect-correcting process. The window is set to, e.g., 5 vertical pixels×5 horizontal pixels. R, G, and B in FIG. 4 represent the colors that are applied to the pixels and refer to red, green, and blue, respectively. The color array corresponds to the color filter mounted on the image sensor 20 and is a Bayer array in this case. When the target pixel is, e.g., the G pixel in the center of the window shown in FIG. 4 (the pixel having the symbol "G" enclosed by two circles "⊚"), the surrounding pixels (reference pixels) that act as references during defect correction are the same color as the target pixel and may include the closest pixels that are positioned above, below, to the left, to the right, and in the four diagonal directions, for a total of 8 pixels. The reference pixels in FIG. 4 are the pixels having the symbol "G" enclosed by a single circle "○".

The defect-correcting circuits 50a through 50c may define the average value or the like of the pixels values of part or all of the eight reference pixels as the corrected pixel value for the target pixel. A variety of systems have been proposed as methods for defining this pixel value.

Calculation is performed in the defect-correcting circuits 50a through 50c using the reference pixels that are present across a plurality of rows. The digital-signal processing circuit 26 may comprise, e.g., a line-memory group for holding the image data D0(n), which is input sequentially one row at a time, in groups of the number of rows equivalent to a window in order to perform the calculation. The defect-correcting circuits 50a through 50c judge whether or not the target pixel positioned in the center of the window is a defective pixel and perform correction processing in the case of a defective pixel while moving the window in the horizontal direction one pixel at a time in the image region of the 5 rows held in the line-memory group. The image data held in the line-memory group is, e.g., replaced using a FIFO system each time the process for one row ends, and a new row is sequentially processed.

The defect-correction levels of the defect-correcting parts 42a through 42c are set weaker or stronger according to differences in the de-noising levels of the first through third de-noising parts 30a through 30c. The defect-correcting circuit 50b is accordingly configured to have a higher defect-correction level than the defect-correcting circuit 50a, while the defect-correcting circuit 50c is configured to have a lower defect-correction level than the defect-correcting circuit 50a.

The differences in defect-correction levels can be defined on the basis of, e.g., the density of defective pixels that can be handled by defect correction. The defect-correcting circuit 50c, which has the lowest defect-correction level among the defect-correcting circuits 50a through 50c, is configured so that, e.g., a corrected pixel value is substituted for the defective target pixel only when none of the eight reference pixels are defective pixels, and the target pixel is not corrected when any of the reference pixels are defective pixels. The defect-correcting circuit 50a, which has the second highest defect-correction level, is configured so that, e.g., defect correction is performed for the target pixel when one or fewer of the eight reference pixels is a defective pixel, and defect correction is not performed for the target pixel when two or more of the reference pixels are defective pixels. The defect-correcting circuit 50b, which has the highest defect-correction level among the defect-correcting circuits 50a through 50c, is configured so that, e.g., defect correction is performed for the target pixel when two or fewer of the eight reference pixels are defective pixels, and defect correction is not performed for the target pixel when three or more of the reference pixels are defective pixels.

The pixel value of the target pixel in the case is represented by $P_T$, and the pixel values of the reference pixels are represented in order of size by $P_1, P_2, \ldots P_8$. The defect-correcting circuit 50c determines that the target pixel is a white spot when $P_T$ satisfies the equation below. $g_W$ is a parameter.

$$P_T \geq P_1 + (P_1 - P_8) \cdot g_W \quad (1)$$

The defect-correcting circuit 50c determines that the target pixel is a black spot when $P_T$ satisfies the equation below. $g_B$ is a parameter.

$$P_T \leq P_8 - (P_1 - P_8) \cdot g_B \quad (2)$$

According to the results of Equations (1) and (2), the defect-correcting circuit 50c detects cases in which there are no defective pixels among the reference pixels and the target pixel alone is a pixel defect. Defect correction is performed for the target pixel in such instances, and image data D3 is output after having been corrected for defects.

The defect-correcting circuit 50a is configured to determine that the target pixel is a white spot when $P_T$ satisfies Equation (3) below and that the target pixel is a black spot when $P_T$ satisfies Equation (4) below.

$$P_T \geq P_2 + (P_2 - P_8) \cdot g_W \quad (3)$$

$$P_T \leq P_7 - (P_1 - P_7) \cdot g_B \quad (4)$$

According to the results of Equations (3) and (4), the defect-correcting circuit 50a detects cases in which the target pixel and one or fewer of the reference pixels are defective pixels. Defect correction is performed for the target pixel in such instances, and image data D1 is output after having been corrected for defects.

In the same manner, the defect-correcting circuit 50b is configured to determine that the target pixel is a white spot when $P_T$ satisfies Equation (5) below and that the target pixel is a black spot when $P_T$ satisfies Equation (6) below.

$$P_T \geq P_3 + (P_3 - P_8) \cdot g_W \quad (5)$$

$$P_T \leq P_6 - (P_1 - P_6) \cdot g_B \quad (6)$$

According to the results of Equations (5) and (6), the defect-correcting circuit 50b detects cases in which the target pixel and two or fewer of the reference pixels are defective pixels. Defect correction is performed for the target pixel in such instances, and image data D2 is output after having been corrected for defects.

The image data D0 that has not been corrected for defects and the image data D1 through D3 that have been corrected for defects and output from the defect-correcting circuits 50a through 50c are input to the mixing circuits 52a through 52c, mixed, and output. Synchronized mixing is performed so that image data for the same pixel is mixed together at this time.

The mixing circuits 52a through 52c are configured to vary the mixing proportions of the two inputs. The mixing proportion is controlled by a control signal CNT1 from the controlling part 34. Image data Da1 through Da3 that are mixed by the mixing circuits 52a through 52c and generated are expressed by the equations below. $\xi_{D1}$ through $\xi_{D3}$ are the respective component proportions of D1 through D3 in Da1 through Da3 and are used as parameters that express the mixing proportions.

$$Da1 = \xi_{D1} \cdot D1 + (1 - \xi_{D1}) \cdot D0 \quad (7)$$

$$Da2 = \xi_{D2} \cdot D2 + (1 - \xi_{D2}) \cdot D0 \quad (8)$$

$$Da3 = \xi_{D3} \cdot D3 + (1 - \xi_{D3}) \cdot D0 \quad (9)$$

The proportions $\xi_{D1}$ through $\xi_{D3}$ can be configured to be able to change in a mutually independent manner. A configuration may also be used in which the process uses separate mixing proportions for white-spot correction and black-spot correction. The controlling part 34 may change the mixing proportions on the basis of, e.g., instructions from the user for adjusting image quality or the like. The number of white spots may rise or fall due to the effects of dark current. The effect of dark current changes according to, e.g., the exposure conditions of the image sensor 20. The controlling part 34 accordingly controls the mixing proportions in connection with the exposure conditions, thereby allowing the adjustment of image quality improvements due to the correction of white spots and of image quality improvements in resolution or other characteristics.

In order to brighten the image in correspondence with low light intensity conditions in exposure control of the image sensor 20, first, e.g., the exposure time is extended, and once the upper limit for exposure time has been reached, AGC (auto gain control) is used to increase the analog gain. Once the upper limit for this gain has been reached, the ADG (auto digital gain control) gain is increased. The controlling part 34 determines the present state of exposure control on the basis of the exposure time and the gains, and changes the proportions $\xi_{D1}$ through $\xi_{D3}$ according to that state. For example, since dark current tends to increase to the extent that exposure control shifts the image to the brighter range, the controlling part 34 increases the proportion $\xi_{D1}$ continuously or in stages. White spots, which may increase under exposure conditions of low light intensity, can thereby be appropriately corrected. On the other hand, the proportion $\xi_{D1}$ is set lower during photography at high light intensity, and white-spot correction is moderately controlled, whereby resolution can be ensured.

The defect-correcting part 42a outputs the image data Da1 from the mixing circuit 52a, and this image data Da1 is input to the noise-suppressing part 44a. In the same way, the image data Da2 is output by the defect-correcting part 42b from the mixing circuit 52b and is input to the noise-suppressing part 44b;1 and the image data Da3 is output by the defect-correcting part 42c from the mixing circuit 52c and is input to the noise-suppressing part 44c.

The noise-suppressing parts 44a through 44c minimize dark-current shot noise and other random noise contained in the image signal. The aforedescribed differences in de-noising levels of the first through third de-noising parts 30a through 30c can also be implemented using the differences in the level of noise suppression of the noise-suppressing parts 44a through 44c. The noise-suppressing parts 44a through 44c may comprise, e.g., low-pass filters (LPF) that act as means for removing or suppressing random noise. The random-noise suppression level can be changed using the cut-off frequency of the LPF in this configuration. Specifically, the noise-suppressing part 44b has an LPF set to a lower cut-off frequency than the noise-suppressing part 44a, whereby the noise-suppression level can be set higher while resolution is ensured in the noise-suppressing part 44a. The noise-suppressing part 44c has an LPF set to a higher cut-off frequency than the noise-suppressing part 44a, whereby contour extraction can be appropriately performed instead of lowering the noise-suppression level.

The noise-suppressing parts 44a through 44c can suppress random noise using circuits for two-dimensional filtering as described below. FIG. 5 is a schematic diagram that shows an example of an arrangement of image data and the positions of a target pixel and reference pixels in an image region (referred to as a "window" below) used in two-dimensional filter (referred to as a "de-noising filter" below) processing. The notation system is basically identical to FIG. 4, e.g., the window is 5 vertical pixels by 5 horizontal pixels. A total of, e.g., 4 four reference pixels are established to the top, bottom, left, and right of the target pixel.

The de-noising filter ignores the upper a pixel when the 5 pixels comprising the target pixel and the four reference pixels are arranged in order of largest to smallest pixel value. The average of the pixel values of the remaining pixels is determined, and this average value is assigned to the target pixel as a converted pixel value. The de-noising effect of the de-noising filter increases with the number of ignored a pixels. Accordingly, a is set to, e.g., 3 in the noise-suppressing part 44b, 2 in the noise-suppressing part 44a, and 1 in the noise-suppressing part 44c, whereby random-noise suppression levels can be implemented according to the aforedescribed differences in de-noising levels of the first through third de-noising parts 30a through 30c.

The noise-suppressing parts 44a through 44c can use the aforedescribed LPFs and de-noising filters to generate image data Db1 through Db3, respectively, which result from removing or reducing the dark-current shot noise and the like in the input image data Da1 through Da3, respectively. The noise-suppressing parts 44a through 44c may be configured in the same manner as the defect-correcting parts 42a through 42c to be provided with mixing circuits and to mix and output the image data Db1 through Db3, which have been subjected to de-noising, and the input image data Da1 through Da3 in variable proportions according to a control signal CNT2 from the controlling part 34. The mixing proportions can be controlled according to exposure conditions in the same manner as the defect-correcting part 42a and the like. For example, the proportion of Db1 is raised when the exposure time is set longer and dark current noise may increase, whereby dark current noise can be appropriately removed.

The noise-suppressing part 44a outputs image data Dc1 from the mixing circuit, and this image data Dc1 is input to the brightness-processing part 36. In the same way, image data Dc2 is output by the noise-suppressing part 44b from the mixing circuit and is input to the color-processing part 40; and image data Dc3 is output by the noise-suppressing part 44c from the mixing circuit and is input to the contour-processing part 38.

Differences in sensitivity exist between the R, G, and B pixels of the image sensor 20 due to the characteristics of the color filter and other factors. Different output levels may be generated for R, G, and B even for objects of the same brightness. These differences in level generate periodic fluctuations in the level of the image signal according to the array period of the color filter and become aliasing noise, which is a primary factor in resolution deterioration and in disturbing image contours and producing moire patterns. Accordingly, the brightness-processing part 36 and the contour-processing part 38 balance the average RGB levels over the entire screen for the input image data Dc1 and Dc3, respectively.

The brightness-processing part 36 and the contour-processing part 38 are provided with filters having traps at the Nyquist frequency $f_N$ as LPFs. An optical filter having a cut-off frequency slightly higher than $f_N$ is provided for the light incident on the image sensor 20. The majority of the frequency components that are equal to or greater than $f_N$ and that become aliasing noise are removed by the LPFs and the optical filter, but aliasing noise may remain near $f_N$. The aforedescribed process for balancing RGB levels removes or reduces this residual aliasing noise.

After performing this balancing process, the brightness-processing part 36 performs gamma correction and other processes on the image data and generates and outputs a brightness signal according to the brightness of the image. After performing the aforementioned balancing process, the contour-processing part 38 generates a contour-correction signal according to the quadratic differential waveform of the image signal. The contour-correction signal output from the contour-processing part 38 is additively synthesized into the brightness signal output from the brightness-processing part 36 in an additive-synthesis circuit 60. The additive-synthesis circuit 60 outputs a brightness signal Y that has been subjected to contour correction.

The color-processing part 40 performs color separation on input image data, generates image signals for R, G, and B, and performs white balance on these R, G, and B signals. The color-processing part 40 then calculates a color-difference matrix for the white-balanced R, G, and B signals and generates and outputs color-difference signals U, V.

In the aforedescribed configuration, an example was given in which one of the two inputs of the mixing circuit 52a of the defect-correcting part 42a was designated as the image data D0 that has not been corrected for defects, but a configuration may also be used in which a plurality of defect-correcting circuits of different defect-correction levels are provided to the defect-correcting part 42a, and the outputs of these circuits are mixed by the mixing circuit 52a.

The defective-pixel numbers $k_1$ through $k_3$, which are the number of defective reference pixels that can be handled by the defect-correcting circuits 50a through 50c, were designated as $k_1=1$, $k_2=2$, and $k_3=0$ in the aforedescribed configuration, but other values that satisfy the relationship $k_3<k_1<k_2$ may also be used.

In another possible configuration, by changing the mixing proportions in the mixing circuits 52a through 52c, differences are provided to the defect-correction levels of the defect-correcting parts 42a through 42c even when the defect-correction levels of the defect-correcting circuits 50a through 50c are the same. This configuration may also be simplified so that a defect-correcting circuit is used in common by the three de-noising parts 30a through 30c. In other words, the portion of the de-noising part 30 corresponding to defect correction may comprise one defect-correcting circuit and the three mixing circuits 52a through 52c. All of the mixing circuits 52a through 52c receive the input of the image data D0 and the image data from the shared defect-correcting circuit, while the mixing proportions are set differently, whereby image data having mutually different defect-correction levels can be obtained from the mixing circuits 52a through 52c.

The values of $g_W$ and $g_B$ in Equations (1) through (6) may also be changed, whereby image data of different defect-correction levels can be obtained.

Variably controlling the defect-correction levels according to exposure time or other factors is simple in a configuration in which the mixing circuits 52a through 52c are used as described above. On the other hand, when variable control is not necessary, the circuits can be simplified when mixing circuits are not used and the defect-correcting parts 42a through 42c are made to comprise defect-correcting circuits 50a through 50c that merely have different defect-correction levels.

The aforedescribed variations of the configurations of the defect-correcting parts 42a through 42c may also be applied to the configurations of the noise-suppressing parts 44a through 44c.

The digital-signal processing circuit 26 becomes capable of high-speed processing by using a configuration in which defect correction, noise suppression, and various other processes are performed by hardware circuits. The various processes of the digital-signal processing circuit 26 may also be implemented as microprocessors and the programs executed thereby.

The defect-correction levels and noise-suppression levels of the de-noising part 30 of the present image-signal processing device are set to the highest level for the image data supplied to the color-processing part 40, the lowest level for the image data supplied to contour-processing part 38, and an intermediate level for the image data supplied to the brightness-processing part 36. By using these settings, appropriate defect correction and noise suppression can be achieved in the color-processing part 40 that generates the color-difference signals U, V. The loss of contour data due to defect correction and noise suppression is prevented in the contour-processing part 38, and contours can be appropriately reinforced. Resolution is maintained in the brightness-processing part 36 while allowing pixel defect correction and random-noise suppression to be performed. The levels of defect correction and noise suppression can thus be set appropriately for the brightness-processing part 36, the contour-processing part 38, and the color-processing part 40, and therefore image quality can be improved in images representing the brightness signal Y and the color-difference signals U, V that are obtained using these processing parts 36 through 40.

The defect-correction levels and noise-suppression levels can be variably controlled for the individual processing parts 36 through 40, and therefore changes in exposure time and the like can be handled and image quality can be ensured.

As described above, an image-signal processing device according to the present invention comprises a de-noising part for performing a de-noising process on a source image signal generated by an image sensor and for generating de-noised image signals of a plurality of types having mutually different de-noising levels and including at least a first de-noised image signal and a second de-noised image signal; a brightness processing part for generating a brightness signal according to the brightness of an image on the basis of the first de-noised image signal; and a color-processing part for generating a color signal according to the color of the image on the basis of the second de-noised image signal, which has a higher de-noising level than that of the first de-noised image signal. In this configuration, the de-noising part may further generate a third de-noised image signal; and the image-signal processing device may further comprise a contour-processing part for generating a contour-correction signal according to contours of the image on the basis of the third de-noised image signal, which has a lower de-noising level than that of the first de-noised image signal.

The de-noising process may comprise a defect-correcting process for addressing pixel defects in the image sensor, and respective defect correction levels of the de-noised image signals may be set weaker or stronger according to the de-noising levels.

The de-noising part may be configured to be capable of controlling the de-noising level of at least one of the plurality of types of the de-noised image signals.

Another image-signal processing device according to the present invention comprises a first de-noising part for subjecting a source image signal generated by an image sensor to a de-noising process, which includes a first defect-correcting process, and for generating a first de-noised image signal; a second de-noising part for subjecting the source image signal to a de-noising process, which includes a second defect-correcting process that is stronger than the first defect-correcting process, and for generating a second de-noised image signal; a brightness processing part for generating a brightness signal according to the brightness of an image on the basis of the first de-noised image signal; and a color-processing part for generating a color signal according to the color of the image on the basis of the second de-noised image signal. This configuration may also further comprise a third de-noising part for subjecting the source image signal to a de-noising process, which includes a third defect-correcting process that is weaker than the first defect-correcting process, and for generating a third de-noised image signal; and a contour-processing part for generating a contour-correction signal according to contours of the image on the basis of the third de-noised image signal.

A configuration may be used wherein the defect-correcting processes generate a corrected pixel value for a target pixel on the basis of reference pixels surrounding the target pixel when the target pixel is a defective pixel; the first defect-correcting process generates the corrected pixel value when the number of defective pixels included in the reference pixels is less than or equal to $k_1$ (where $k_1 \geq 1$); the second defect-correcting process generates the corrected pixel value when the number of defective pixels included in the reference pixels is less than or equal to $k_2$ (where $k_2 > k_1$); and the third defect-correcting process generates the corrected pixel value when the number of defective pixels included in the reference pixels is less than or equal to $k_3$ (where $k_3 < k_1$).

A configuration may also be used wherein at least one of the first through third de-noising parts is configured to be capable of controlling the defect correction level.

The present image-signal processing device may also configured to further comprise a controlling part for generating a control signal for the defect correction level according to exposure control in the image sensor when the source image signal is acquired, wherein at least one of the plurality of de-noising parts is configured to be capable of controlling the defect correction level on the basis of the control signal for those pixels among the pixel defects of the image sensor that are white-spot pixels that produce an excessive signal charge.

According to the present invention, the image signals input to the brightness-processing part, the contour-processing part, and the color-processing part are subjected to defect-correcting processes or de-noising processes of mutually different levels. The brightness signal has a significant effect on resolution, and the color signal has a relatively small effect on resolution. The de-noising of the image signal input to the brightness processing part is thus ideally limited to a lower level than that of the image signal input to the color-processing part. The contour-correcting process makes use of the fact that the difference in values between adjoining pixels increases at contour (edge) portions of the image. The de-noising of the image signal input to the contour-processing part is thus ideally limited to a lower level than that of the image signal input to the brightness-processing part. The levels of de-noising of the input image signals are accordingly set to increase in the order of the contour-processing part, the brightness-processing part, and the color-processing part in the present invention, whereby appropriate states can be achieved for resolution, contour correction, and de-noising.

What is claimed is:

1. An image-signal processing device, comprising:
    a de-noising part for performing de-noising processes having mutually different de-noising levels on a source image signal generated by an image sensor and for generating a plurality of types of de-noised image signals which include at least a first de-noised image signal and a second de-noised image signal that has a higher de-noising level than that of the first de-noised image signal, from the source image signal;
    a brightness processing part for generating a brightness signal according to a brightness of an image on the basis of the first de-noised image signal; and
    a color-processing part for generating a color signal according to a color of the image on the basis of the second de-noised image signal.

2. The image-signal processing device according to claim 1, wherein
    the de-noising part further generates a third de-noised image signal which has a lower de-noising level than that of the first de-noised image signal from the source image signal; and
    the image-signal processing device further comprises:
    a contour-processing part for generating a contour-correction signal according to contours of the image on the basis of the third de-noised image signal.

3. The image-signal processing device according to claim 1, wherein
    each of the de-noising processes includes a defect-correcting process for addressing pixel defects in the image sensor;
    the de-noising part is preliminarily set defect correction levels corresponding to the de-noised image signals and performs the defect-correcting process corresponding to each of the de-noised image signals at a corresponding defect correction level and
    the respective defect correction levels of the de-noised image signals are preliminarily set weaker or stronger according to the de-noising levels of the de-noised image signals.

4. The image-signal processing device according to claim 1, wherein
    the de-noising part is configured to be capable of controlling the de-noising level of at least one of the plurality of types of the de-noised image signals.

5. An image-signal processing device, comprising:
    a first de-noising part for subjecting a source image signal generated by an image sensor to a de-noising process, which includes a first defect-correcting process, and for generating a first de-noised image signal;
    a second de-noising part for subjecting the source image signal to a de-noising process, which includes a second defect-correcting process that is stronger than the first defect-correcting process, and for generating a second de-noised image signal;
    a brightness processing part for generating a brightness signal according to the brightness of an image on the basis of the first de-noised image signal; and
    a color-processing part for generating a color signal according to the color of the image on the basis of the second de-noised image signal.

6. The image-signal processing device according to claim 5, further comprising:
    a third de-noising part for subjecting the source image signal to a de-noising process, which includes a third defect-correcting process that is weaker than the first defect-correcting process, and for generating a third de-noised image signal; and
    a contour-processing part for generating a contour-correction signal according to contours of the image on the basis of the third de-noised image signal.

7. The image-signal processing device according to claim 6, wherein
    the defect-correcting processes generate a corrected pixel value for a target pixel on the basis of reference pixels surrounding the target pixel when the target pixel is a defective pixel;
    the first defect-correcting process generates the corrected pixel value when the number of defective pixels included in the reference pixels is less than or equal to $k_1$ (where $k_1 \geq 1$);
    the second defect-correcting process generates the corrected pixel value when the number of defective pixels included in the reference pixels is less than or equal to $k_2$ (where $k_2 > k_1$); and
    the third defect-correcting process generates the corrected pixel value when the number of defective pixels included in the reference pixels is less than or equal to $k_3$ (where $k_3 < k_1$).

8. The image-signal processing device according to claim 5, wherein
    at least one of the plurality of de-noising parts is configured to be capable of controlling the defect correction level of the de-noised image signal.

9. The image-signal processing device according to claim 5, comprising
    a controlling part for generating a control signal for the defect correction level of the de-noised image signal according to exposure control in the image sensor when the source image signal is acquired, wherein
    at least one of the plurality of de-noising parts is configured to be capable of controlling the defect correction level on the basis of the control signal for those pixels among the pixel defects of the image sensor that are white-spot pixels that produce an excessive signal charge.

10. The image-signal processing device according to claim 1, wherein
    magnitude relation between the de-noising levels of the de-noised image signals is maintained constant.

11. The image-signal processing device according to claim 5, wherein
    magnitude relation between the de-noising levels of the de-noised image signals is maintained constant.

* * * * *